United States Patent [19]
Uta et al.

[11] Patent Number: 6,144,694
[45] Date of Patent: Nov. 7, 2000

[54] TRANSMITTING APPARATUS FOR CODE DIVISION MULTIPLEXED SIGNALS

[75] Inventors: Takaki Uta, Yokohama; Takashi Yano, Tokorozawa; Nobukazu Doi, Hachioji, all of Japan

[73] Assignee: Hitachi, Ltd., Tokyo, Japan

[21] Appl. No.: 08/944,997

[22] Filed: Oct. 7, 1997

[30] Foreign Application Priority Data

Oct. 17, 1996 [JP] Japan .................................. 8-274484

[51] Int. Cl.[7] .......................... H04L 27/30; H04L 25/49
[52] U.S. Cl. .................................. 375/146; 375/297
[58] Field of Search .................................. 375/140, 146, 375/295, 296, 297; 370/320, 335, 342, 441, 479, 532, 537

[56] References Cited

U.S. PATENT DOCUMENTS

| | | | |
|---|---|---|---|
| 5,742,595 | 4/1998 | Bhagalia | 375/287 |
| 5,751,705 | 5/1998 | Sato | 375/297 |
| 5,838,733 | 11/1998 | Bruckert | 375/297 |

*Primary Examiner*—Stephen Chin
*Assistant Examiner*—Albert Park
*Attorney, Agent, or Firm*—Sofer & Haroun, LLP

[57] ABSTRACT

A transmitting apparatus for code division multiplexed signals used in the spread spectrum communication has its analog amplifier rid of spurious generation and relieved of the need of having a large transmission back-off, thereby accomplishing the low-power, low-cost and simple design of the amplifier.

Multi-channel transmission signals are rendered the spread spectrum with a spread code, and the resulting code division multiplexed signal undergoes the peak amplitude limitation so that the last-stage analog amplifier can have a small back-off.

8 Claims, 8 Drawing Sheets

TRANSMITTING APPARATUS FOR CODE DIVISION MULTIPLEXED SIGNALS

BACKGROUND OF THE INVENTION

1. Field of the Invention

The present invention relates to a transmitting apparatus for code division multiplexed signals, and more particularly to a transmitting apparatus which composes multiple pieces of orthogonal-code-converted transmission information, renders the spread spectrum with a spread code for the composed signal, and transmits the resulting wireless multiplexed signal.

2. Description of the Prior Art

Figure 8:
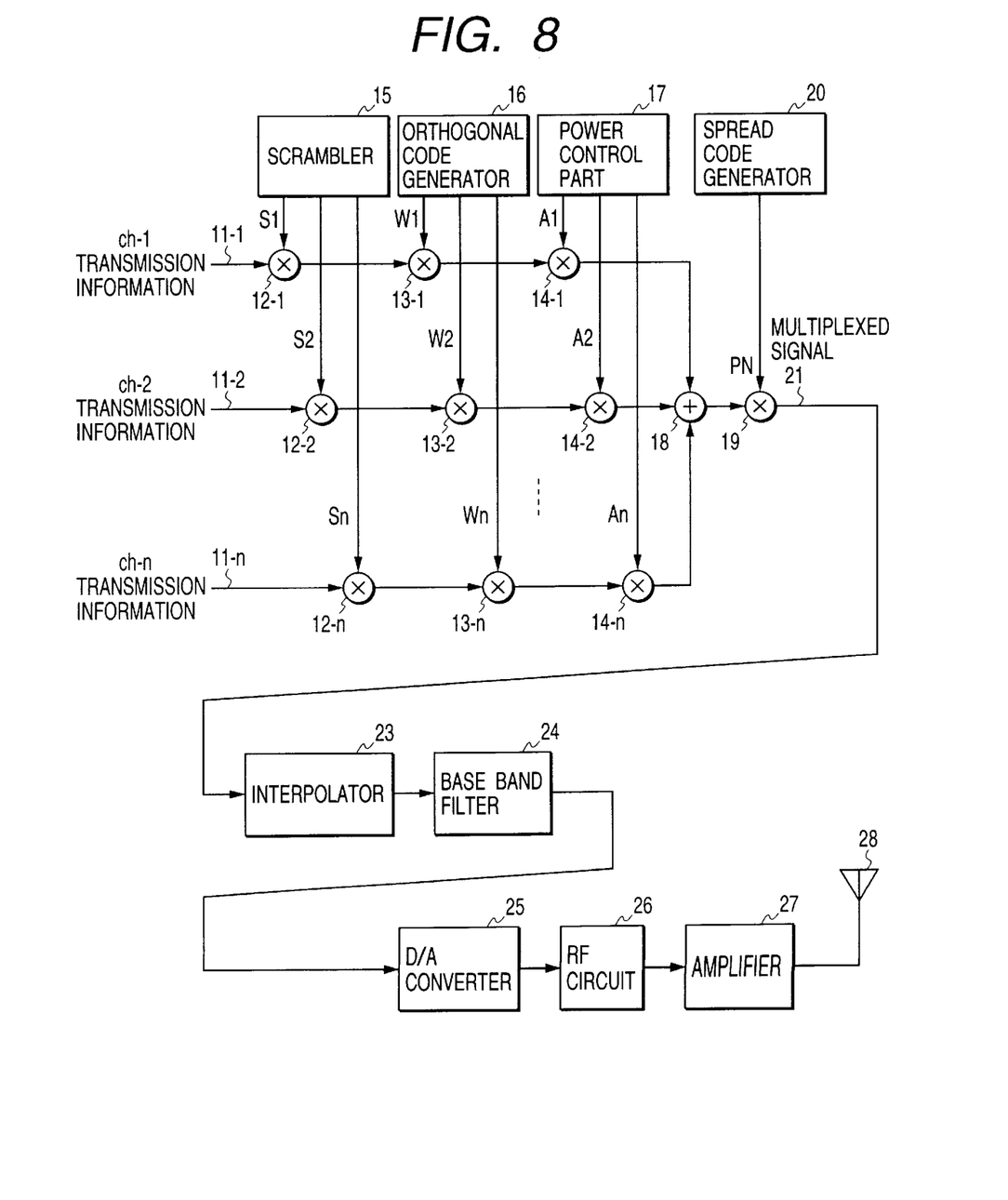
FIG. 8 is a block diagram showing the arrangement of the conventional transmitting apparatus for code division multiplexed signals.

A conventional transmitting apparatus for code division multiplexed signals (e.g., the code division multiplexing communication equipment described in publication "TIA/EIA INTERIM STANDARD, TIA/EIA/IS-95-A,7,1.3.1", May 1995) used for the spread spectrum communication has its transmitter section designed such that transmission information $11\text{-}i$ (where $i=1,2,\ldots n$) of multiple channels are scrambled so that a multiplexed signal 21 resulting from the composition of the multiple channels has characteristics close to the white noise as shown in FIG. 8.

Scrambling is carried out by multiplying the transmission information $11\text{-}i$ to scramble signals Si produced by a scrambler 15 with multipliers $12\text{-}i$, respectively. For the orthogonal transformation of the transmission information, the scrambled transmission information are multiplied to orthogonal codes Wi produced by an orthogonal code generator 14 with multipliers $13\text{-}i$, respectively. Next, the transmission information of the channels are multiplied to power setup values Ai provided by an information power controller 15 so that each channel has a prescribed power level, and the resulting transmission information of all channels are summed by an adder 18. The output of the adder 18 is multiplied to a spread code (termed simply PN code) provided by a spread code generator 20 with a multiplier 19, resulting in a spread spectrum multiplexed signal 21. The multiplexed signal 21 has its sampling rate raised by an interpolator 23 so that it undergoes bandwidth limitation by a digital filter. In the case of raising the sampling rate by 4, for example, the interpolator 23 operates to insert three 0-amplitude samples between the original sampling points. A baseband filter 24 is used to limit the bandwidth of the over-sampled signal. The baseband filter 24 has its output signal converted into an analog signal by a D/A converter 25, converted in frequency to have the carrier frequency by an RF circuit 26, amplified in power by an amplifier 27, and transmitted by an antenna 28.

The above-mentioned conventional transmitting apparatus of the code division multiplex communication equipment uses the scrambler 15 so as to provide the multiplexed signal with characteristics close to the white noise, so that the signals of all channels have less chance of having the same value simultaneously and the amplifier does not have input signal components of excessive amplitudes.

However, the spread code mentioned above is generally a pseudo-random number, and due to the summation of the multiple communication channels following the rendition of spread spectrum, the amplitude of the multiplexed signal 21 has virtually a normal distribution in general. Namely, a signal component with a large amplitude can possibly arise, although the frequency of occurrence is very low. When the analog last-stage amplifier 27 receives an input signal having an amplitude in excess of its linear operation region, the amplifier has its output signal distorted, resulting in a spurious generation outside its own bandwidth. Release of spurious from the antenna 28 is illegal, and therefore it is crucial to design the circuit so that it does not create a spurious. On this account, the analog amplifier 27 is provided with a wide linear operation region, i.e., large back-off. Since the circuit arrangement of FIG. 8 following the D/A converter 25 is configured with analog circuits, providing a large back-off cases the amplifier to have a degraded power efficiency and need a power source of a higher voltage. Moreover, it necessitates an up-sized D/A converter 25 and RF circuit 26 against the intention of low manufacturing cost and compact design of the apparatus.

SUMMARY OF THE INVENTION

Accordingly, it is an object of the present invention to provide a transmitting apparatus for code division multiplexed signals capable of reducing the transmission back-off without creating a spurious.

In order to achieve the above objective, the inventive transmitting apparatus for code division multiplexed signals comprises means of generating a spread-spectrum code division multiplexed signal, a baseband filter which limits the frequency bandwidth of the code division multiplexed signal, and an output section including circuits for converting in frequency the output signal of the baseband filter to provide a carrier frequency and amplifying the converted signal, wherein an amplitude limiter for limiting the amplitude of the code division multiplexed signal is connected between the code division multiplexed signal generation means and the baseband filter.

Preferred circuit arrangements of the amplitude limiter include:

(1) An amplitude limiting circuit is used to clip the code division multiplexed signal at a certain signal level, and the clipped code division multiplexed signal is fed to the baseband filter.

(2) An attenuator of variable attenuation factor is placed on the path of the code division multiplexed signal, another baseband filter different from the above-mentioned one is used to determine the time span in which the amplitude of code division multiplexed signal is controlled, and an amplitude controller is used to control the attenuation factor of the attenuator in the time span.

(3) The amplitude limiting circuit of item (1) is followed at its output by the attenuator and amplitude controller, which controls the attenuation factor of the attenuator, of item (2).

The inventive transmitting apparatus is capable of reducing the back-off of the last-stage amplifier without inviting the creation of spurious. The amplifier can have a reliably narrow linear operation range, enabling the low-power operation. The D/A converter and RF circuit, which are analog circuits, can have a smaller dynamic range, allowing the compact and low-cost design of the apparatus. The attenuator, amplitude controller, and associated circuits added based on this invention to the conventional transmitting apparatus are all digital circuits which can be accomplished by an LSI, fostering the compact design of the apparatus.

Although the reception of a signal that has undergone the amplitude limitation on the transmitting apparatus distorts the multiplexed signal, the dominant noise against a spread-spectrum code division multiplexed signal for the receiving apparatus is generally attributable to interfering signals coming from other stations, and the distortion noise is negligible relatively. Therefore, conventional receiving apparatus can be used intact for receiving spread-spectrum code division multiplexed signals.

These and other features and advantages of the present invention will become more apparent from the following detailed description of the preferred embodiments taken in conjunction with the accompanying drawings.

BRIEF DESCRIPTION OF THE DRAWINGS

FIGS. 6(A,B) is a diagram used to explain the operation of the amplitude controller in FIG. 5;

DESCRIPTION OF THE PREFERRED EMBODIMENTS

Embodiments of this invention will be explained with reference to the drawings.
Embodiment 1

Figure 1:
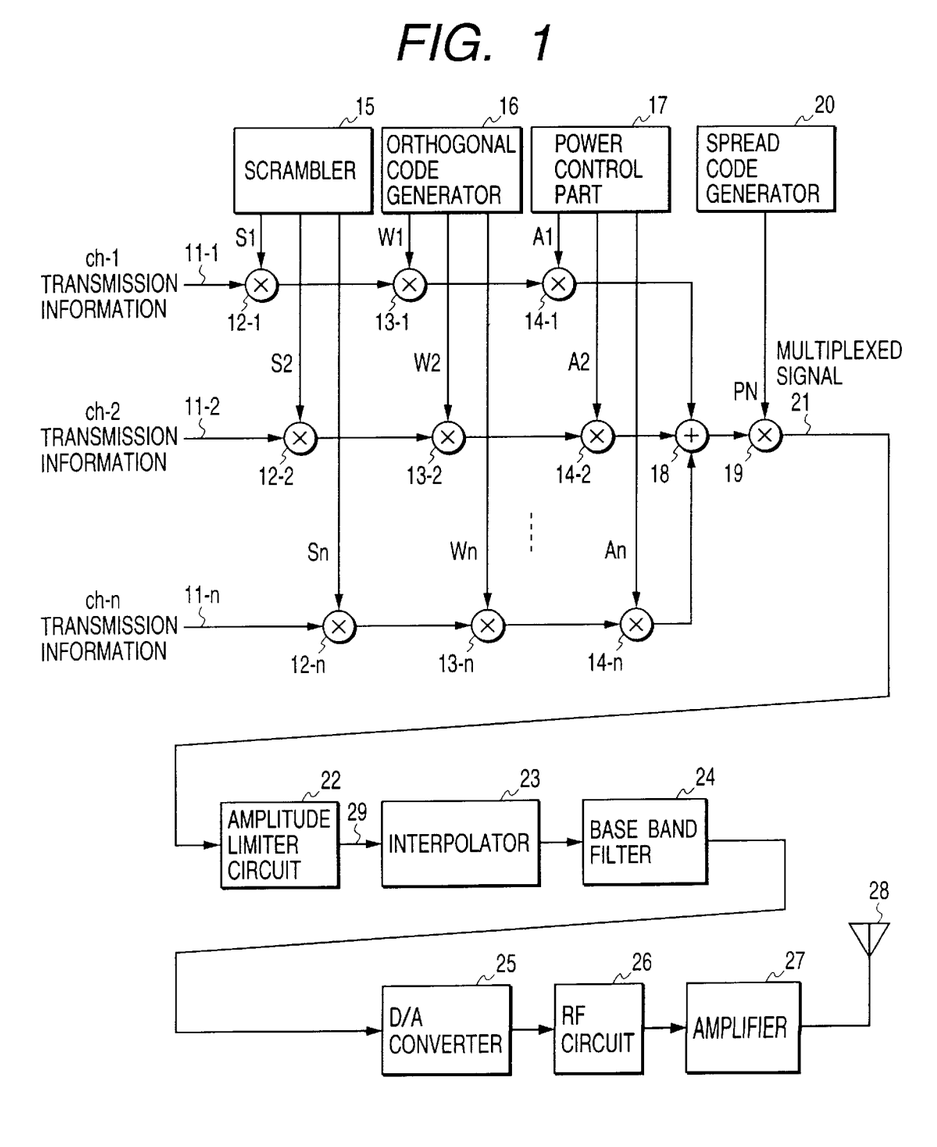
FIG. 1 is a block diagram showing the arrangement of the transmitting apparatus for code division multiplexed signals based on a first embodiment of this invention.

FIG. 1 is a block diagram which shows the transmitting apparatus for code division multiplexed signals based on the first embodiment of this invention. The circuit arrangement is basically the same as the conventional apparatus except for the presence of an amplitude limiting circuit 22.

Transmission information 11-1 through 11-n of multiple channels ch-1 through ch-n to be transmitted are scrambled such that a multiplexed signal 21 resulting from the composition of the multi-channel signals has characteristics close to the white noise. Scrambling is carried out by multiplying the transmission information 11-1 through 11-n to scramble signals S1–Sn produced by a scrambler 15 with multipliers 12-1 through 12-n, respectively. The scramble signals Sl-Sn are bi-level pulses having the same periods as the pulse periods of the transmission information 11-1 through 11-n.

For the orthogonal transformation of the transmission information, the output signals of the multipliers 12-1 through 12-n are multiplied to orthogonal codes W1–Wn produced by an orthogonal code generator 14 with multipliers 13-1 through 13-n, respectively. The orthogonal codes W1–Wn are orthogonal function codes having the same period as the chip period of the PN code which will be explained later, and are such pulse signals that the integral value of Wi×Wi within the period of transmission information pulse is 1 and the integral value of Wi×Wm (where i≠m) is 0.

The output signals of the multipliers 13-1 through 13-n are multiplied to power setup values A1–An provided by a power controller 17 so that each channel has a prescribed power level, and the resulting transmission information of all channels are summed by an adder 18. The summed signal is multiplied to a PN code provided by a spread code generator 20 with a multiplier 19, resulting in a multiplexed signal 21, which is fed to the amplitude limiting circuit 22. The amplitude limiting circuit 22 operates to limit the peak amplitude, i.e., it clips the multiplexed signal at a certain signal level. The output signal 29 of the amplitude limiting circuit 22 is fed through an interpolator 23 which implements the oversampling for the signal and a baseband filter 24 which confines the bandwidth of the oversampled signal, and then converted into an analog signal by a D/A converter 26. The analog signal is converted in frequency to have the carrier frequency by an RF circuit 26, amplified to have a certain power level by an amplifier 27, and transmitted by an antenna 28. These operations are basically the same as the conventional circuit arrangement except for the use of the amplitude limiting circuit 22.

Figure 2:
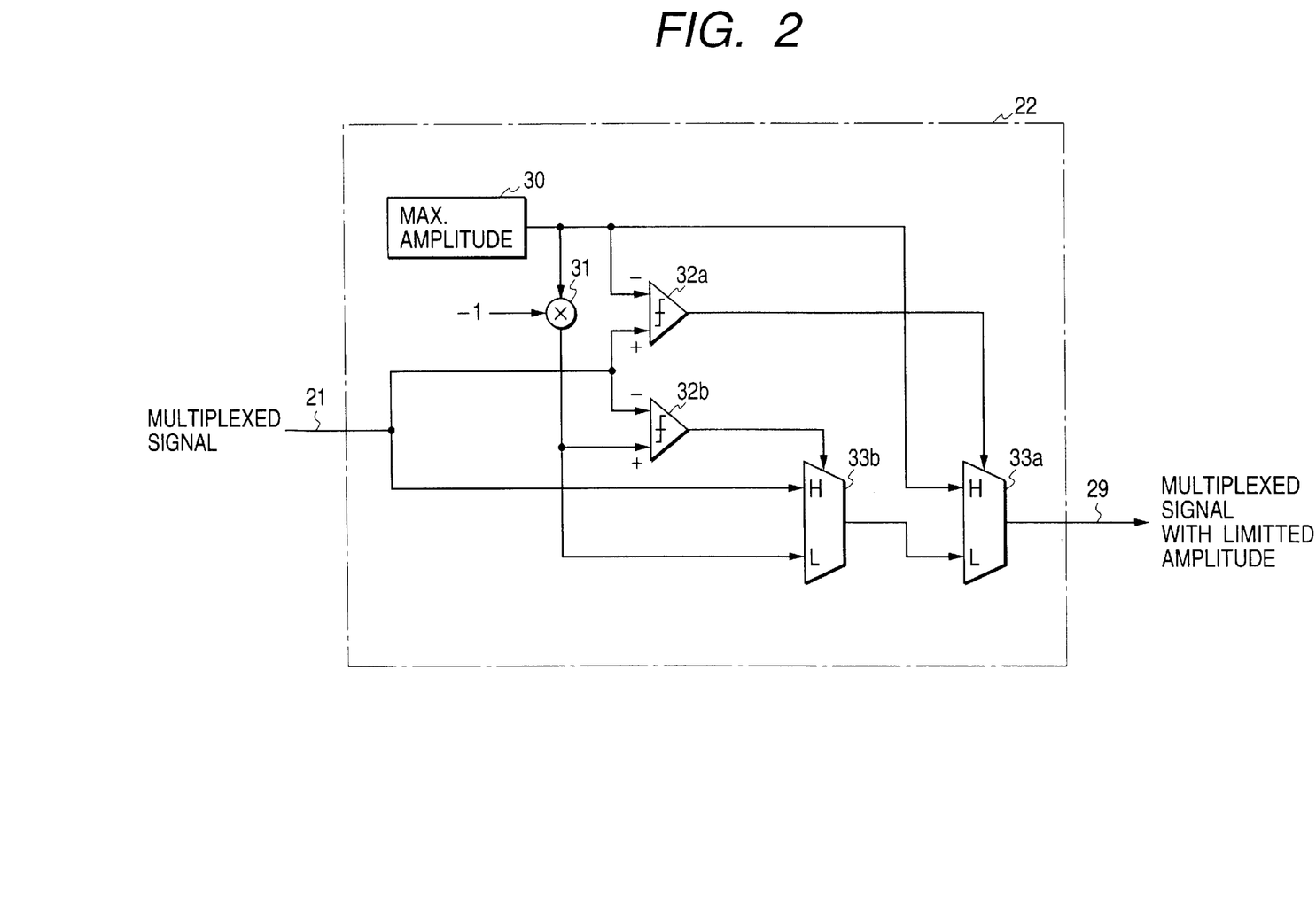
FIG. 2 is a schematic diagram of an example of the amplitude limiting circuit 22 in FIG. 1.

FIG. 2 shows an example of the arrangement of the amplitude limiting circuit 22 shown in FIG. 1, and FIG. 3 explains the operation of this circuit. The amplitude limiting circuit 22 includes a comparator 32a which compares the multiplexed signal 21 with the positive peak amplitude 30, a comparator 32b which compares the multiplexed signal 21 with the signal resulting from the polarity inversion of the positive peak amplitude 30 by a multiplier 31, a selector 33b which is controlled by the output of the comparator 32b to select the multiplexed signal 21 or the inverted signal, and a selector 33a which is controlled by the output of the comparator 32a to select the positive peak amplitude 30 or the output of the selector 33b.

As shown in FIG. 3, the comparator 32a compares the multiplexed signal 21 with the positive peak amplitude 30, and, if the former is greater than the latter, produces a signal to let the selector 33a select and release its H input. The comparator 32b compares the multiplexed signal 21 with the negative peak amplitude which is the positive peak amplitude 30 multiplied by −1, and, if the former is greater than the latter, produces a signal to let the selector 33b select and release its H input.

Figure 3A:
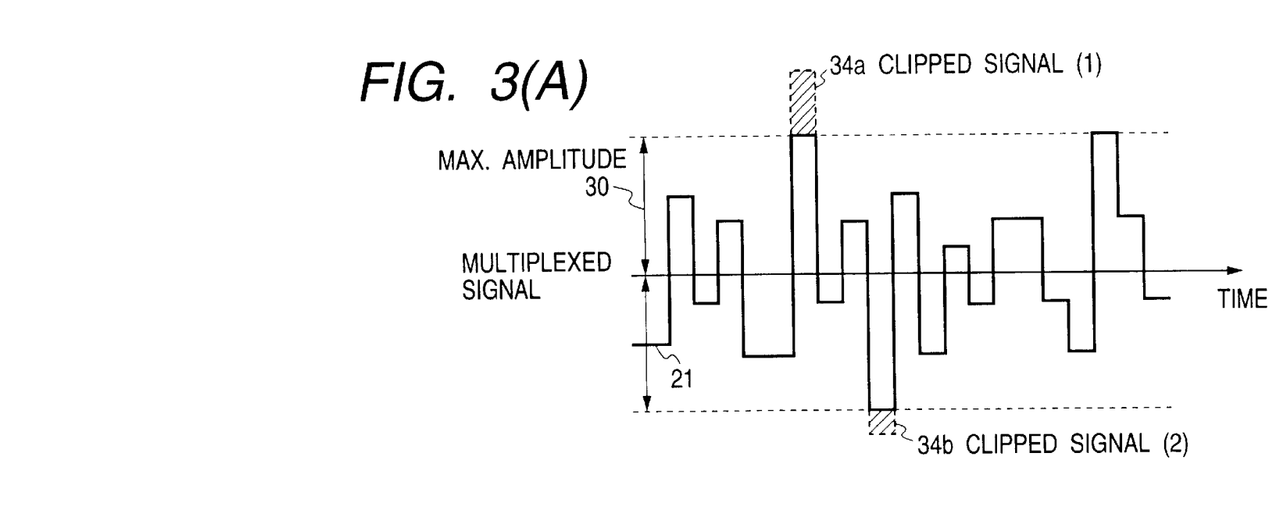
FIGS. 3A and 3B are diagrams used to explain the operation of the amplitude limiting circuit 22 in FIG. 1.

The selector 33b releases the multiplexed signal 21 or the negative peak amplitude by selecting its H input or L input, respectively. The selector 33a releases the clipped signal at the peak amplitude 30 or the output of the selector 33b by selecting its H input or L input, respectively. Clipped signals 34a and 34b are shown in the example of FIG. 3A.

Figure 3B:
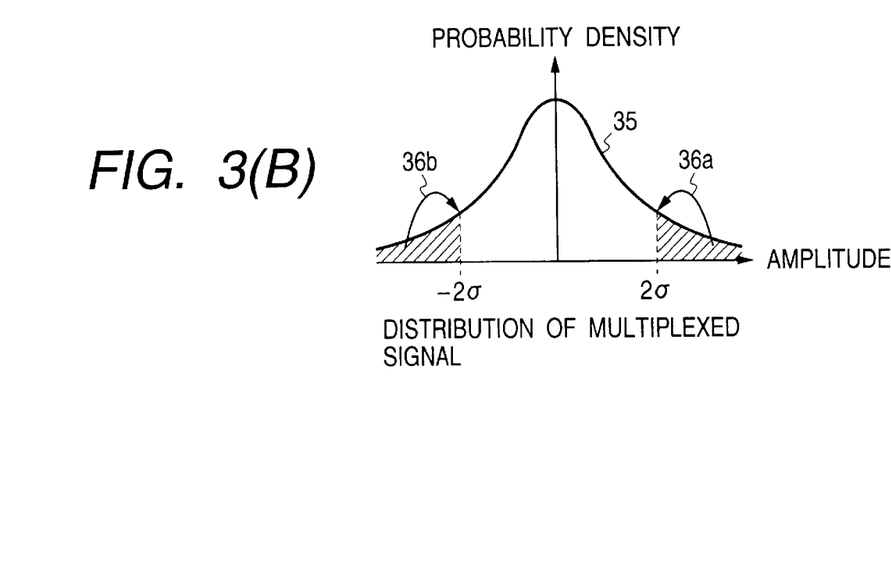

Assuming that the signal amplitude has a normal distribution 35 as shown in FIG. 3B and the amplitude limiting circuit 22 clips the signal at the level twice the standard deviation σ, signals indicated by 36a and 36b are clipped signals in the example of FIG. 3B. Although the clipping operation distorts the multiplexed signal and creates a noise, the dominant noise in code division multiplexing (CDMA) is generally attributable to interfering signals coming from other stations and therefore the clipping noise is negligible.

The circuit arrangement of the first embodiment is simple based on the sole addition of the simple amplitude limiting circuit 22 to the conventional circuit arrangement.
Embodiment 2

Figure 4:
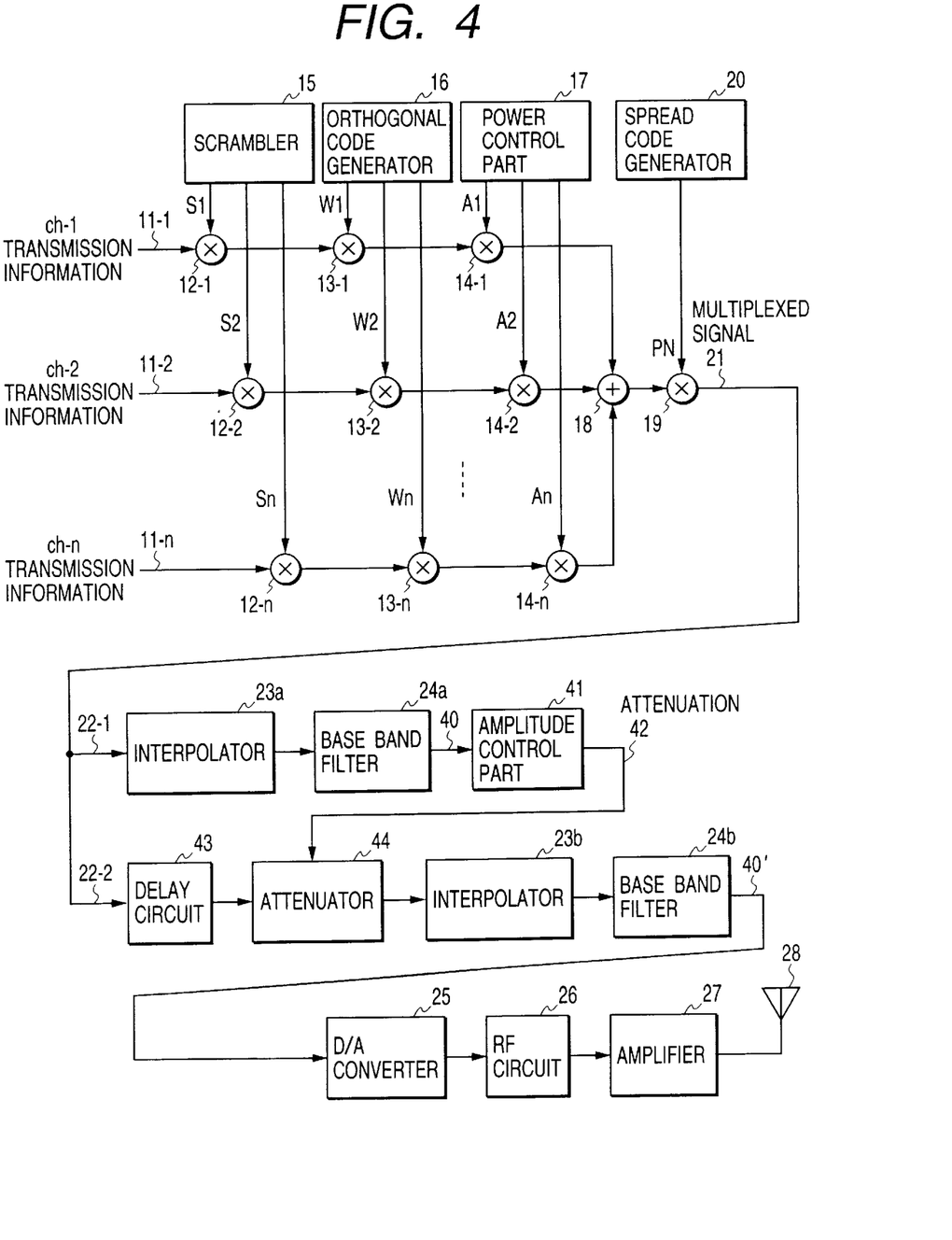
FIG. 4 is a block diagram showing the arrangement of the transmitting apparatus for code division multiplexed signals based on a second embodiment of this invention.

FIG. 4 is a block diagram which shows the transmitting apparatus for code division multiplexed signals based on the second embodiment of this invention. In the figure, portions identical to those of FIG. 1 are referred to by the same symbols, and detailed explanation thereof will be omitted. The apparatus of this embodiment treats the multiplexed signal 21 in two ways. One multiplexed signal 22-1 is rendered the bandwidth limitation by an interpolator 23a and baseband filter 24a, and thereafter fed to an amplitude controller 41. The amplitude controller 41 detects the amplitude of the bandwidth-limited signal, and, on detecting a signal amplitude greater than the prescribed level, varies the attenuation signal 42 to attenuate a delayed multiplexed signal which will be explained shortly. Another multiplexed signal 22-2 is delayed by a delay circuit 43 equally in time to the delay time of the baseband filter 24a. An attenuator 44 is controlled by the attenuation signal 42 produced by the amplitude controller 41 to attenuate the delayed multiplexed signal 22-2. The output signal of the attenuator 44 is fed through another interpolator 23b and baseband filter 24b so as to undergo the bandwidth limitation. Accordingly, the output signal of the baseband filter 24b is within the amplitude level specified by the amplitude controller 41. The output signal 40' of the baseband filter 24b is treated by a D/A converter 21, RF circuit 22 which converts the signal in frequency to provide the carrier frequency, and amplifier 23, and transmitted by an antenna 24.

Figure 5:
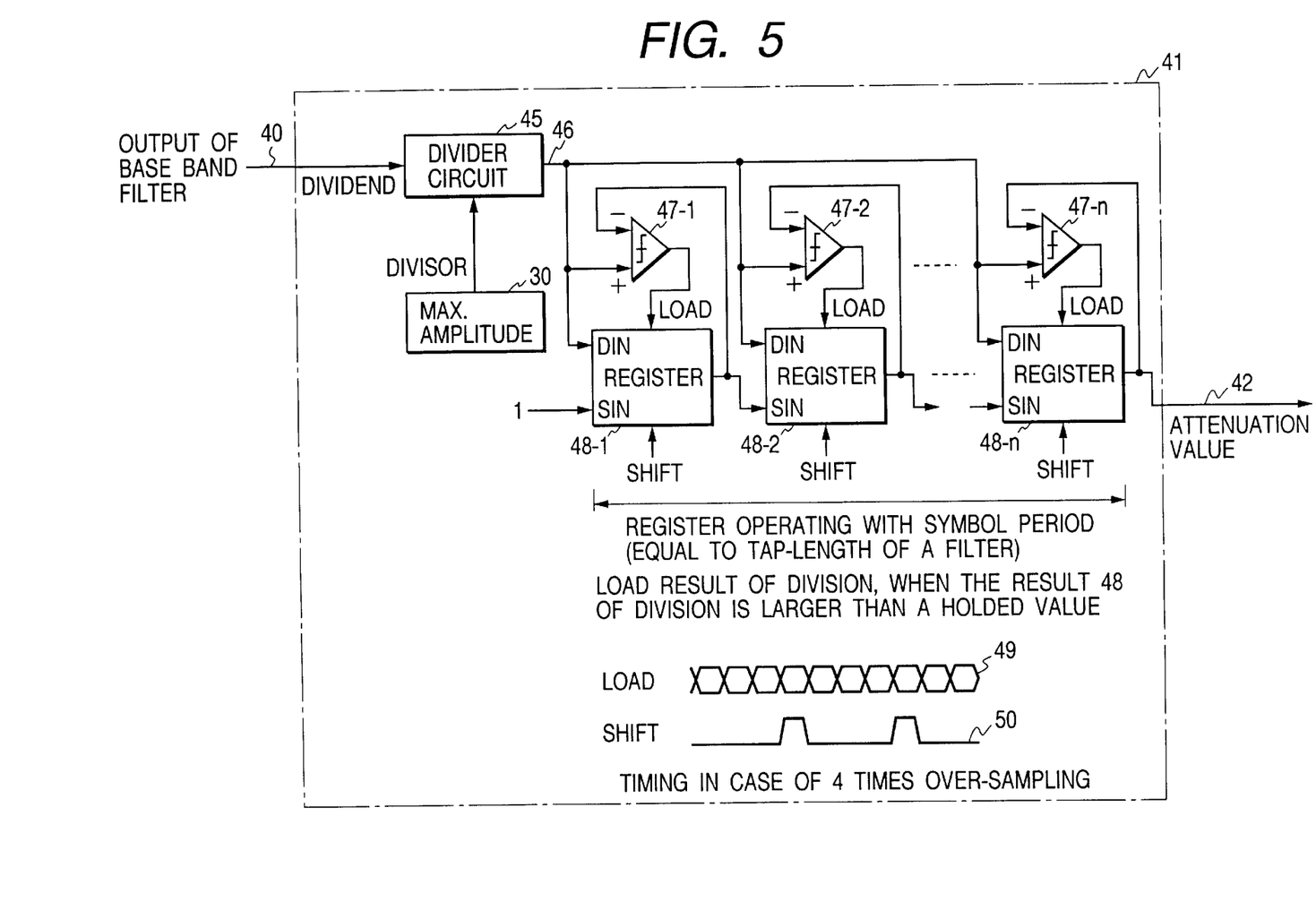
FIG. 5 is a block diagram showing the arrangement of the amplitude controller in FIG. 4.

FIG. 5 shows an example of the arrangement of the amplitude controller 41. The amplitude controller 41 consists of a division circuit 45, registers 48-1 through 48-n, and comparators 47-1 through 47-n. The division circuit 45 divides the value of the output signal 40 of the baseband filter 24a with the value of the peak amplitude 30.

A division result 46 from the division circuit 45 is compared with values held in the registers 48-1 through 48-n by the comparators 47-1 through 47-n, respectively. Each comparator 47-i produces a high(H)-level output if the division output 46 is greater than the value held by it. Each comparator 47-i has its output given to the LOAD terminal of the associated register so that the division output is load into the register when the comparator produces a high-level output.

The registers 48-1 through 48-n have their contents shifted by one position to the right, i.e., the register 48-n receives the contents of the register 48-(n–1), and the register 48-(n–1) receives the contents of the register 48-(n–2), and so on, with the register 48-1 receiving "1" and the register 48-n delivering its contents as the attenuation signal 42, in response to each high(H)-level input received on their SHIFT terminals. The timing of the signals on the LOAD and SHIFT terminals of the registers in the case of 4-fold oversampling is shown by 49 and 50 in FIG. 5.

Figure 6A:
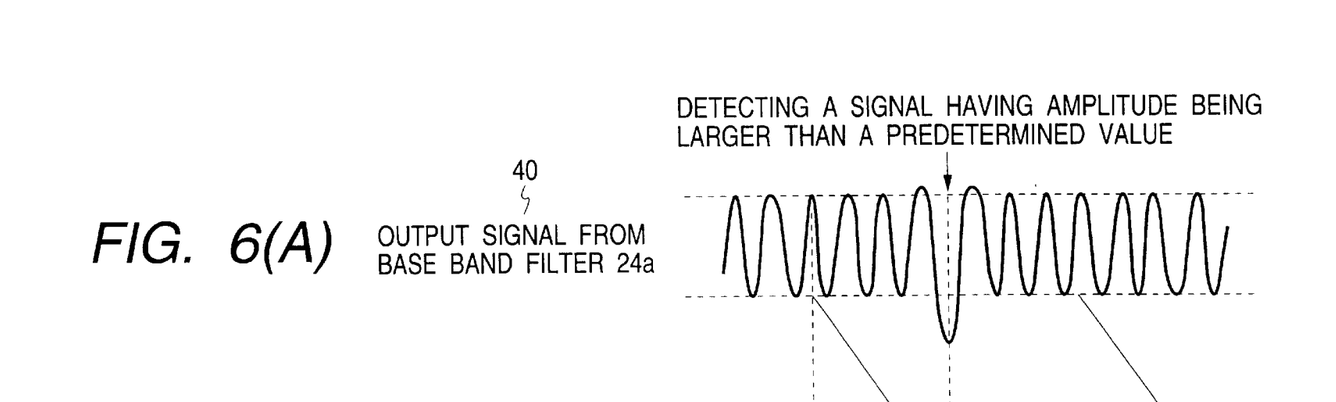
Figure 6B:
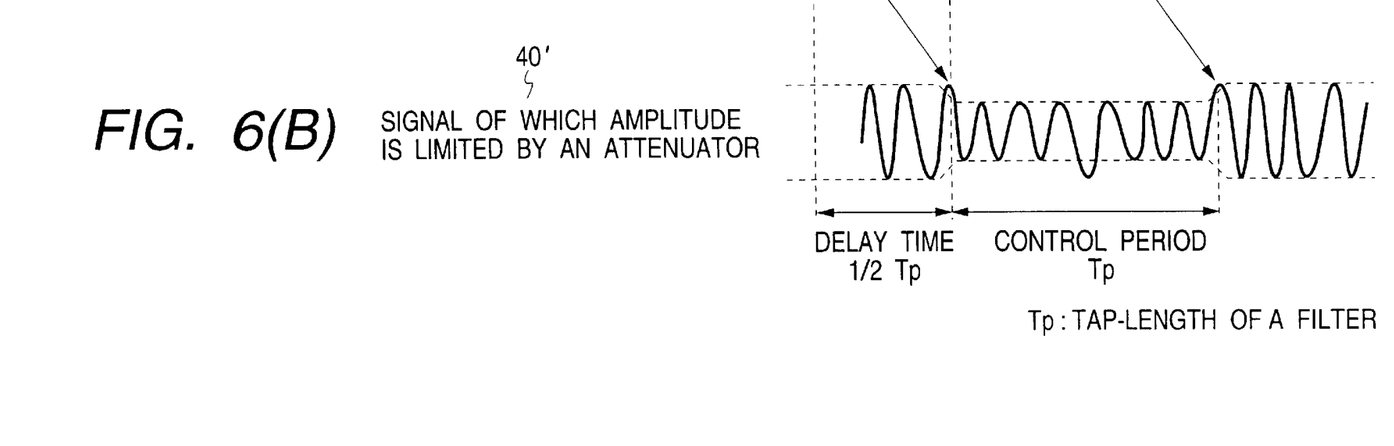

FIG. 6 shows the signal waveforms during the operation of the second embodiment. Shown by FIG. 6A is the waveform of the output signal of the baseband filter 24a when the signal in excess of the prescribed level is detected. At the time point of detection, the output signal of the delay circuit is attenuated by the extent of the tap length of the baseband filter. Shown by FIG. 6B is the signal 40' that is the multiplexed signal attenuated by the attenuator 44 and treated by the interpolator 23b and baseband filter 24b.

Although partial attenuation of the multiplexed signal spoils the orthogonal attribute among channels and creates a noise, the period of attenuation is shorter than the period of symbols, and therefore this noise is negligible relative to the interference of other stations.

Embodiment 3

Figure 7:
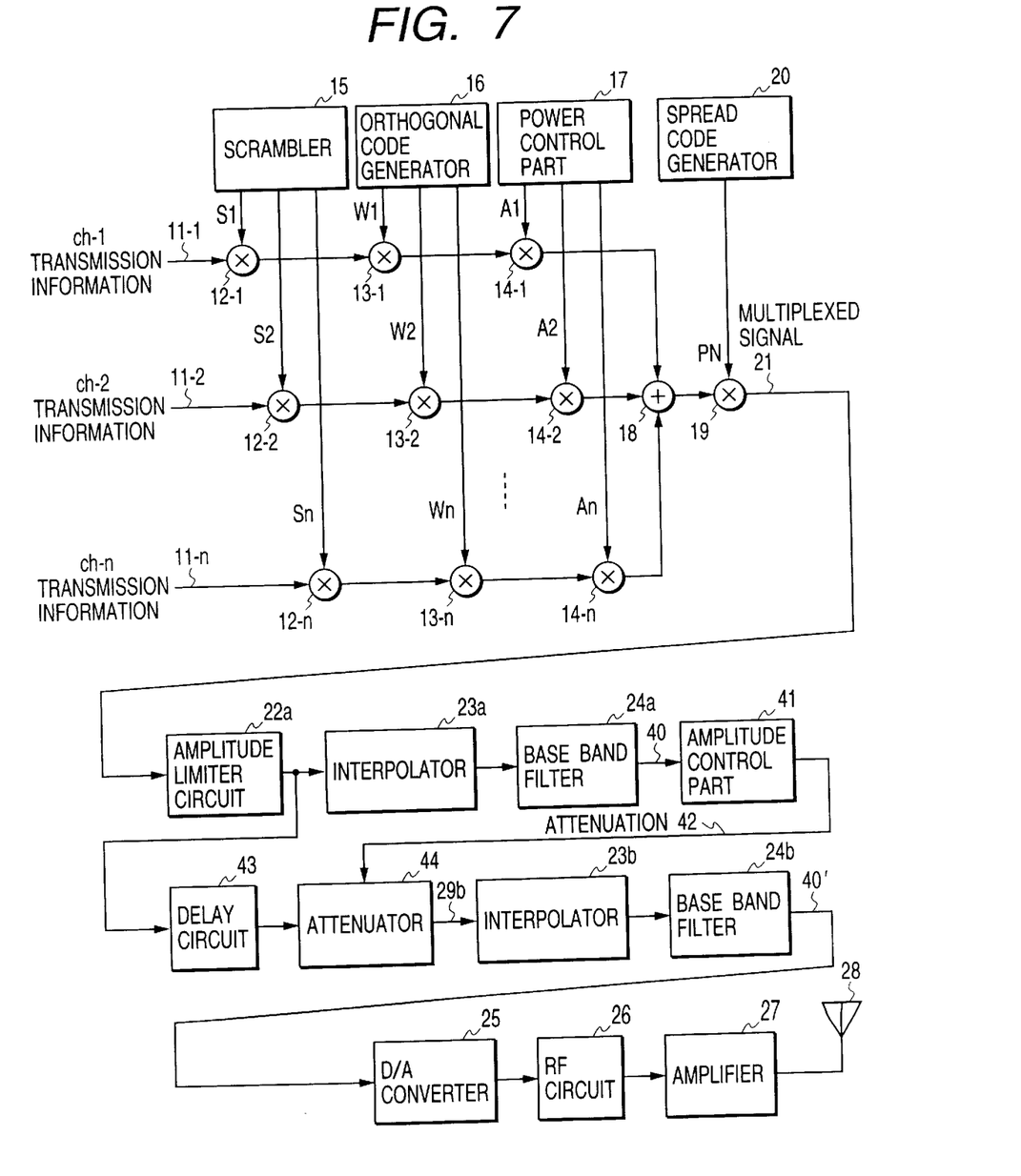
FIG. 7 is a block diagram showing the arrangement of the transmitting apparatus for code division multiplexed signals based on a third embodiment of this invention.

FIG. 7 is a block diagram which shows the transmitting apparatus for code division multiplexed signals based on the third embodiment of this invention. In the figure, portions identical to those of FIG. 1 and FIG. 4 are referred to by the same symbols, and detailed explanation thereof will be omitted. The apparatus of this embodiment treats the multiplexed signal 21 in two ways as in the second embodiment after the amplitude is limited by an amplitude limiting circuit 22a similar to the circuit 22 of the first embodiment. Specifically, the multiplexed signal 21 is fed to the interpolator 23a and also to the delay circuit 43. This circuit arrangement can reduce the degree of attenuation exerted by the attenuator 44, thereby reducing the distortion of the signal in the case of a long-tapped baseband filter 24, and also can reduce the dynamic range (number of bits) of the registers 48, etc. in the amplitude controller 41, allowing the down-sizing of the circuit parts.

What is claimed is:

1. A transmitting apparatus for code division multiplexed signals comprising:

means of generating a spread-spectrum code division multiplexed signal;

an amplitude limiter which limits the amplitude of the code division multiplexed signal;

a first baseband filter which limits the bandwidth of the output signal of said amplitude limiter; and an output section including circuits for converting in frequency the output signal of said baseband filter to provide a carrier frequency and amplifying the converted signal, wherein said amplitude limiter comprises a second baseband filter which limits the bandwidth of one split version of the code division multiplexed signal; a control circuit which produces, from the output signal of said second baseband filter, an attenuation control signal for controlling the amplitude of the transmission signal; a delay circuit which delays another split version of the code division multiplexed signal by the extent of the tap length of said second baseband filer; and an attenuator which attenuates the output signal of said delay circuit in response to the attenuation control signal such that the amplitude of the output signal of said first baseband filter is confined within a prescribed amplitude.

2. A transmitting apparatus for code division multiplexed signals according to claim 1, wherein said output section includes a D/A converter which converts the output signal of said second baseband filter into an analog signal, an RF circuit which converts the analog signal in frequency to provide a carrier frequency, and an amplifier which amplifies the output signal of said RF circuit, and said code division multiplexed signal generation means includes a plurality of transmission information sources, a scrambler, orthogonal code generator and power controller provided for each of said transmission information sources, and a circuit which composes the output signals of said power controller by rendering the spread spectrum with a spread code.

3. A transmitting apparatus for code division multiplexed signals comprising:

means of generating a spread-spectrum code division multiplexed signal;

an amplitude limiter which limits the amplitude of the code division multiplexed signal;

a first baseband filter which limits the bandwidth of the output signal of said amplitude limiter; and an output section including circuits for converting in frequency the output signal of said baseband filter to provide a carrier frequency and amplifying the converted signal, wherein said amplitude limiter comprises an amplitude limiting circuit which clips the code division multiplexed signal at a prescribed signal level; a second baseband filter which limits the bandwidth of one split version of the code division multiplexed signal from said amplitude limiting circuit; a control circuit which produces, from the output signal of said second baseband filter, an attenuation control signal for controlling the amplitude of the transmission signal; a delay circuit which delays anther split version of the code division multiplexed signal by the extent of the tap length of said second baseband filter; and an attenuator which attenuates the output signal of said delay circuit in response to the attenuation control signal such that the amplitude of the output signal of said first baseband filter is confined within a prescribed amplitude.

4. A transmitting apparatus for code division multiplexed signals according to claim 3, wherein said control circuit is designed such that if the output signal of said second baseband filter exceeds the prescribed amplitude, the signal, which is delayed by the extent of the filter tap length, is attenuated by the extent of the amplitude of limitation divided by the output of said second baseband filter for the period relevant to the filter tap length.

5. A transmitting apparatus for code division multiplexed signals according to claim 3, wherein said output section includes a D/A converter which converts the output signal of said second baseband filter into an analog signal, an RF circuit which converts the analog signal in frequency to provide a carrier in frequency, and an amplifier which amplifies the output signal of said RF circuit, and said code division multiplexed signal generation means includes a plurality of transmission information sources, a scrambler, orthogonal code generator and power controller provided for each of said transmission information sources, and a circuit which composes the output signals of said power controller by rendering the spread spectrum with spread code.

6. A transmitting apparatus for code division multiplexed signals comprising:

means of generating a spread-spectrum code division multiplexed signal;

an amplitude limiter which limits the amplitude of the code division multiplexed signal;

a first baseband filter which limits the bandwidth of the output signal of said amplitude limiter; and an output section including circuits for converting in frequency the output signal of said baseband filter to provide a carrier frequency and amplifying the converted signal, wherein said amplitude limiter comprises an amplitude limiting circuit which clips the code division multiplexed signal at a prescribed signal level, and said control circuit is designed such that if the output signal of said second baseband filter exceeds the prescribed amplitude, the signal, which is delayed by the extent of the filter tap length, is attenuated by the extent of the amplitude of limitation divided by the output of said second baseband filter for the period relevant to the filter tap length.

7. A transmitting apparatus for code division multiplexed signals comprising:

means of generating a spread spectrum code division multiplexed signal;

an amplitude limiter which limits the amplitude of the code division multiplexed signal;

a first baseband filter which limits the bandwidth of the output signal of said amplitude limiter; and an output section including circuits for converting in frequency the output signal of said baseband filter to provide a carrier frequency and amplifying the converted signal, wherein said amplitude limiter comprises a delay circuit inputting the code division multiplexed signal; and a attenuator circuit adjusting the amplitude of output from said delay circuit, by using a control signal which is derived from said code division multiplexed signal.

8. A method of generating transmitting signals, comprising the steps of:

generating a second code division multiplexed signals by delaying a first spread-spectrum code division multiplexed signal by a predetermined time;

detecting whether an amplitude level of said first spread-spectrum code division multiplexed signal is larger than a predetermined level or not; and reducing the amplitude of the second code division multiplexed signals when the amplitude level of said first spread-spectrum code division multiplexed signal is larger than said predetermined level at the detecting step.

* * * * *